(12) United States Patent
Allendorf et al.

(10) Patent No.: US 9,273,802 B2
(45) Date of Patent: Mar. 1, 2016

(54) FIXTURE AND INSTALLATION METHOD FOR A PITCHED PIPE SYSTEM

(71) Applicant: The Misdun Group, Inc., Southington, CT (US)

(72) Inventors: Eric Allendorf, West Haven, CT (US); John Poplawski, Meridan, CT (US)

(73) Assignee: THE MIDSUN GROUP, INC., Southington, CT (US)

(*) Notice: Subject to any disclaimer, the term of this patent is extended or adjusted under 35 U.S.C. 154(b) by 94 days.

(21) Appl. No.: 13/827,330

(22) Filed: Mar. 14, 2013

(65) Prior Publication Data

US 2013/0192705 A1    Aug. 1, 2013

Related U.S. Application Data

(63) Continuation-in-part of application No. 13/185,686, filed on Jul. 19, 2011, which is a continuation-in-part of application No. 13/328,293, filed on Dec. 16, 2011.

(51) Int. Cl.
| | |
|---|---|
| F16L 3/02 | (2006.01) |
| F16L 3/06 | (2006.01) |
| F16L 3/223 | (2006.01) |
| F16L 3/22 | (2006.01) |
| F16L 3/237 | (2006.01) |
| F16L 3/26 | (2006.01) |
| E03C 1/02 | (2006.01) |

(52) U.S. Cl.
CPC ... *F16L 3/02* (2013.01); *F16L 3/06* (2013.01); *F16L 3/221* (2013.01); *F16L 3/2235* (2013.01); *F16L 3/237* (2013.01); *F16L 3/26* (2013.01); *E03C 2001/028* (2013.01); *Y10T 29/49826* (2015.01)

(58) Field of Classification Search
CPC ............... F16L 3/02; F16L 3/06; F16L 3/08; F16L 3/085; F16L 3/20; F16L 3/22; F16L 3/24; F16L 3/127; F16L 3/221; F16L 3/222; F16L 3/223; F16L 3/237; F16L 3/2235; F16L 3/13
USPC ............................. 138/103, 106, 107; 248/70
See application file for complete search history.

(56) References Cited

U.S. PATENT DOCUMENTS

| | | | | |
|---|---|---|---|---|
| 2,147,091 | A * | 2/1939 | Curtis | 14/75 |
| 3,434,682 | A * | 3/1969 | Nestlerode, Sr. | 248/68.1 |
| 3,677,339 | A * | 7/1972 | Perrin et al. | 165/162 |
| 6,799,607 | B1 * | 10/2004 | Friedline et al. | 138/106 |
| 7,621,486 | B1 * | 11/2009 | Barrepski | 248/65 |
| 8,356,778 | B2 * | 1/2013 | Birli et al. | 248/73 |
| 8,727,024 | B2 * | 5/2014 | Decker et al. | 166/385 |
| 2011/0303456 | A1 * | 12/2011 | Blanchard et al. | 174/480 |

* cited by examiner

*Primary Examiner* — J. Casimer Jacyna
(74) *Attorney, Agent, or Firm* — Joseph R. Carvalko

(57) ABSTRACT

An apparatus, system and method of installation of a pipe in fixed association with at least one stanchion, said stanchion having a universal pipe mount for fixing the distance from a pipe inserted into the pipe holder to a mounting surface, and when two or more stanchions and associated pipe holders are used to insert a pipe, the distance between the pipe holders and the mounting surface create a pitch of the pipe in the direction of the sink and away from the source of a liquid insures the proper rate of gravitational flow of the liquid therein.

10 Claims, 7 Drawing Sheets

US 9,273,802 B2

FIXTURE AND INSTALLATION METHOD FOR A PITCHED PIPE SYSTEM

CROSS-REFERENCE TO RELATED APPLICATIONS

This is a continuation-in-part claiming the priority benefit under 35 U.S.C. 120 of U.S. patent application Ser. No. 13/328,293 entitled Pipe Pitch Apparatus, System and Method of Installation, filed Dec. 16, 2011 and claiming the priority benefit under 35 U.S.C. 120 of U.S. patent application Ser. No. 13/185,686 entitled Pipe Pitch Article, System and Method of Installation, filed Jul. 19, 2011, the entire disclosures of which are hereby incorporated by reference.

FIELD OF THE INVENTION

This application relates generally to pipe installation fixtures for buildings.

BACKGROUND OF THE INVENTION

This invention provides an article and an installation method to insure that the proper pitch is employed in piping systems for the transport of liquids, typically constructed from plastic formulated pipes, such as a polyvinylchloride (PVC) and used in homes, offices and other facilities, generally. Although potable water and waste water, are the most frequent substance transported other fluids such as natural gas and gasoline are transported from one location to another via complex networks of pipes. These networks of pipes typically include long, relatively straight lines that enter into and exit from enclosed spaces, with occasionally intersected branches, and that may additionally bend around various enclosure walls and support structures, making it difficult to maintain a decreasing elevation as the piping progresses over its intended route. One problem with the use of piping systems is to insure that the pitch is in the direction of the sink and away from the source to insure the proper rate of flow and that liquid does not stagnate or worse, have impeded flow because pipes are pitched in the wrong direction. Presently there does not exist any device that insures a fool-proof means to install piping, especially in a rapid production fashion, that guarantees that the piping system is pitched properly, can be installed properly by a relatively unskilled work-force and is virtually no more expensive than the product without such advantages. With the foregoing in mind, the present invention will be distinguished over the prior art in the description and application of new components, design criteria and utility to the field of the invention.

SUMMARY OF THE INVENTION

This invention provides a novel apparatus in for retaining a piping system in fixed but pitched association with a mounting surface. It is used for constructing a piping system including a least one stanchion, said stanchion having affixed thereto a universal pipe mount, vertically adjustable on the stanchion, for fixing a dimension from the pipe holder to a stanchion mounting surface. The apparatus may include two or more ganged or stacked stanchions and associated pipe holders that are used to insert the pipe, the distance between the pipe holders and the mounting surface designed to create a pitch of the pipe in the direction of the sink and away from the source of a liquid to insure the proper rate of gravitational flow.

In another embodiment the disclosure is drawn to an apparatus for a piping system including: a first stanchion, having a dovetail at the head, and a second stanchion having an associated dovetail receiving slot at the foot, said dovetail and receiving slot cooperating for mating said first and second stanchions, and whereby at least one stanchion is fixed to a pipe holder for establishing a distance from the pipe holder to the mounting surface, creating a pitch of the pipeline in the direction of the sink and away from the source of a liquid to insure the proper rate of gravitational flow.

In yet another embodiment the apparatus for a piping system includes: a first stanchion having movably secured thereto a universal fixture that employs a dovetail slot on each side to permit mounting a pipe holder having a dovetail. The apparatus further includes a boss with an eyelet which contains a through hole to permit threading a string line from the stanchion, for vertical adjustment according to a position relative to a pitch line, such as a sloped roof.

An embodiment of the invention also includes a method for pipe installation in a piping system including: mounting one or more pipes, each of said pipes in fixed association with mount, said mount vertically adjustably associated with the stanchion; establishing a pitch between the pipe relative to the mounting surface; utilizing a reference pitch elevation angle $\theta$ formed by the pitched reference and string line attached to the mount; setting a vertical distance between the mount and the pitched reference.

BRIEF DESCRIPTION OF THE DRAWINGS

This invention is best understood from the following detailed description when read in connection with the accompanying drawing. The various features of the drawing are not specified exhaustively. On the contrary, the various features may be arbitrarily expanded or reduced for clarity. Included in the drawing are the following figures.

DETAILED DESCRIPTION OF THE INVENTION

Figure 1:
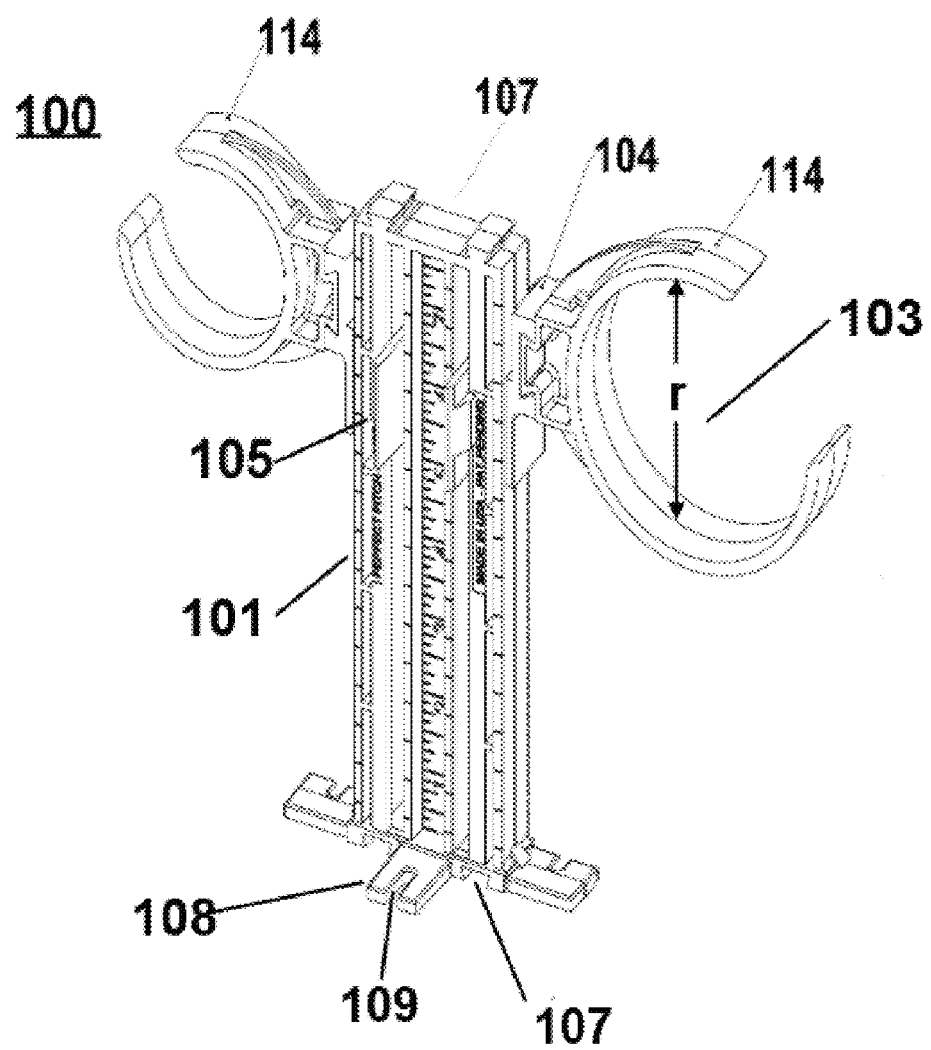
FIG. 1 illustrates a perspective view of the pipe pitch apparatus in accordance with one embodiment of the present invention.

FIG. 1 shows a perspective view of the pipe pitch apparatus 100 in accordance with embodiments of the present invention and as previously substantially disclosed in the cross-referenced applications, Ser. No. 13/328,293 and Ser. No. 13/185,686. Stanchion 101 is used as the mounting device for a pipe holder 114 accessory to hold by way of example and not limitation a common pipe for transporting liquids. The pipe holder 114 is secured to the stanchion 101 via a universal adapter 104 having a tab 105 that cooperate to affixes to the face of the stanchion. One or more mounting feet, such as foot 108 secures the stanchion to a plane surface, such as a floor, ceiling or wall, utilizing by way of example and not limitation, an adhesive or a fastener, such as a nail or screw. A pipe recess 103 secures a pipe in the grip of a holder 114 that encompasses an angle of greater than 180 degrees, once inserted into the opening. The wide opening 103 is shown as a three-quarter open claim (approximately 270 degrees). In other applications an open configuration, such as a "U" shaped clamp of having an opening of 180 degrees or less, by way of example and not limitation, may be employed for applications such as heating-ventilation-air-conditioning ("HVAC") line sets, cables, phone lines etc, where the transmission device is held secure according to the requirements of the installation specification. The "U" shaped clamp configuration or the greater than 180 degree holder 114 may typically be used in applications to lift the held item above a surface such as a roof top, while roofing installers/applicators spray urethane or apply weatherproofing compounds, roof insulation or foam panels to roof substrates and ultimately the top coat of rubber roof sealant.

Figure 2:
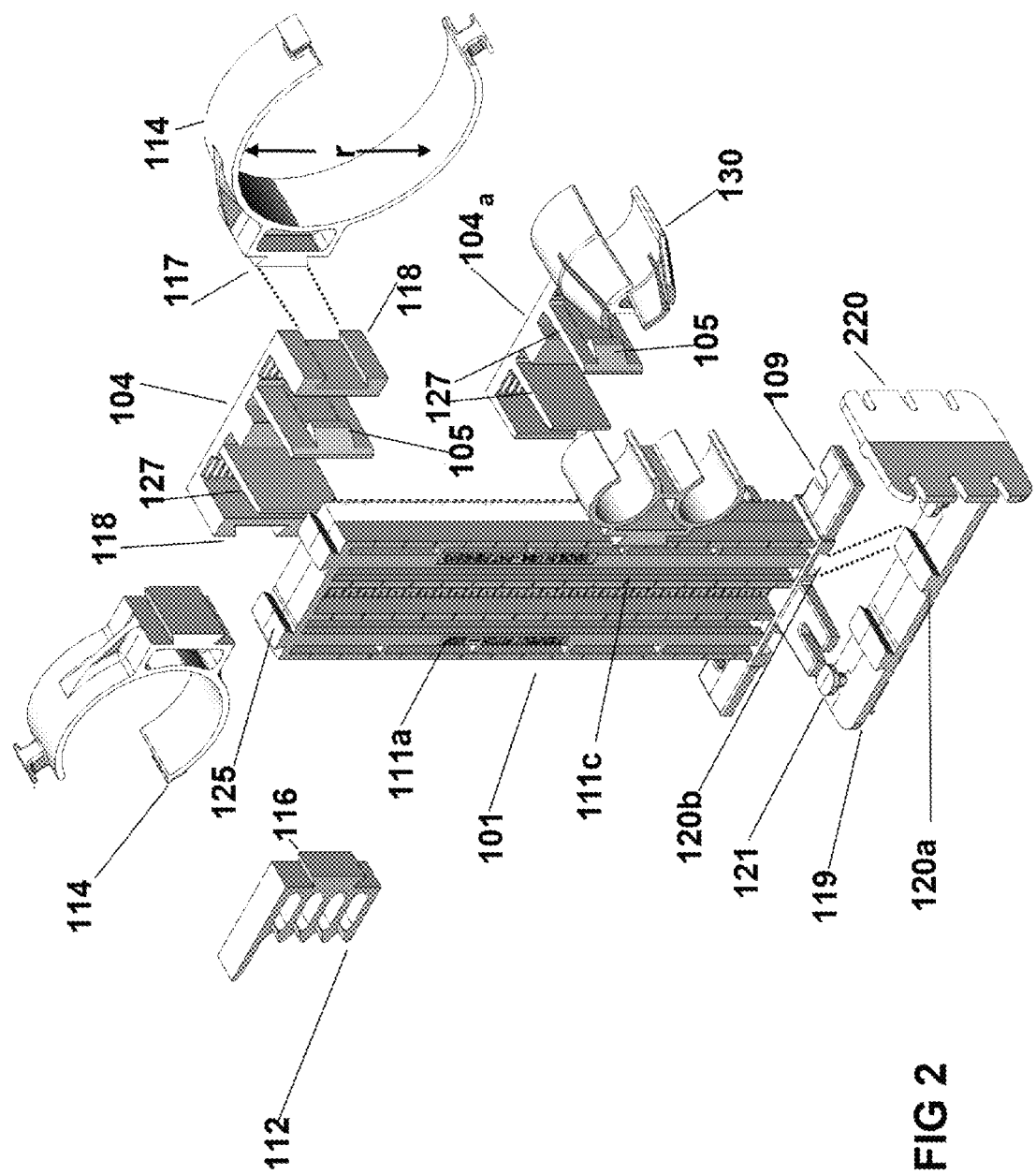
FIG. 2 illustrates a perspective view of the system of accessories of the pipe pitch apparatus and system in accordance with one embodiment of the present invention.

FIG. 2 illustrates a number of attachments or accessories that may be fitted to the stanchion 101 to hold various construction items, such as pipes, wires and other fixtures. In embodiments of the present disclosure, FIG. 2 show a gas fired furnace pipe holder 130, and the pipe holder 114, all manufactured in various sizes having differing internal radii "r" sized to accommodate various sized pipes. Additionally the stanchion 101 may itself mount on a 90 degree bracket 119, where the bracket is then permanently mounted on a vertical surface, such as a bulkhead, wall or vertical beam, such as a construction stud.

FIG. 2 illustrates that each of the accessories has a mounting feature that allows affixation to the stanchion 101. By way of example, a wire holder 112 and the pipe holder 114 has an associated dove tail 117 that slips into an accommodating guide-way, recess or slot 118 found on each side of universal mount 104. Mount 104 then is securely affixed to the stanchion 101 utilizing the tab 105 and the guide 127, which applies a lateral tension to the internal sides of beams 111a and 111c, as further disclosed in the cross-referenced applications. Briefly, the tab 105 secures member 127 by gripping the front surface of the stanchion 101 beams 111a and 111c, respectively, to retain the mount 104 fixed along the horizontal cross-section of the stanchion 101. Similarly, mount 104a integral to gas furnace pipe holder 130 utilizes tabs 105 to secure members 127 by gripping the front surface of beams 111a and 111c, respectively, to retain the mount 104a fixed along the horizontal cross-section of the stanchion 101. And, again, similarly, wire holder 112 has a dove tail 116 that slips into the slid-way slot 118 on the mount 104 that then affixes to the stanchion 101. The stanchion may hold multiple items, such as by example and not limitation, 112, 114, and 130 simultaneously.

Figure 3:
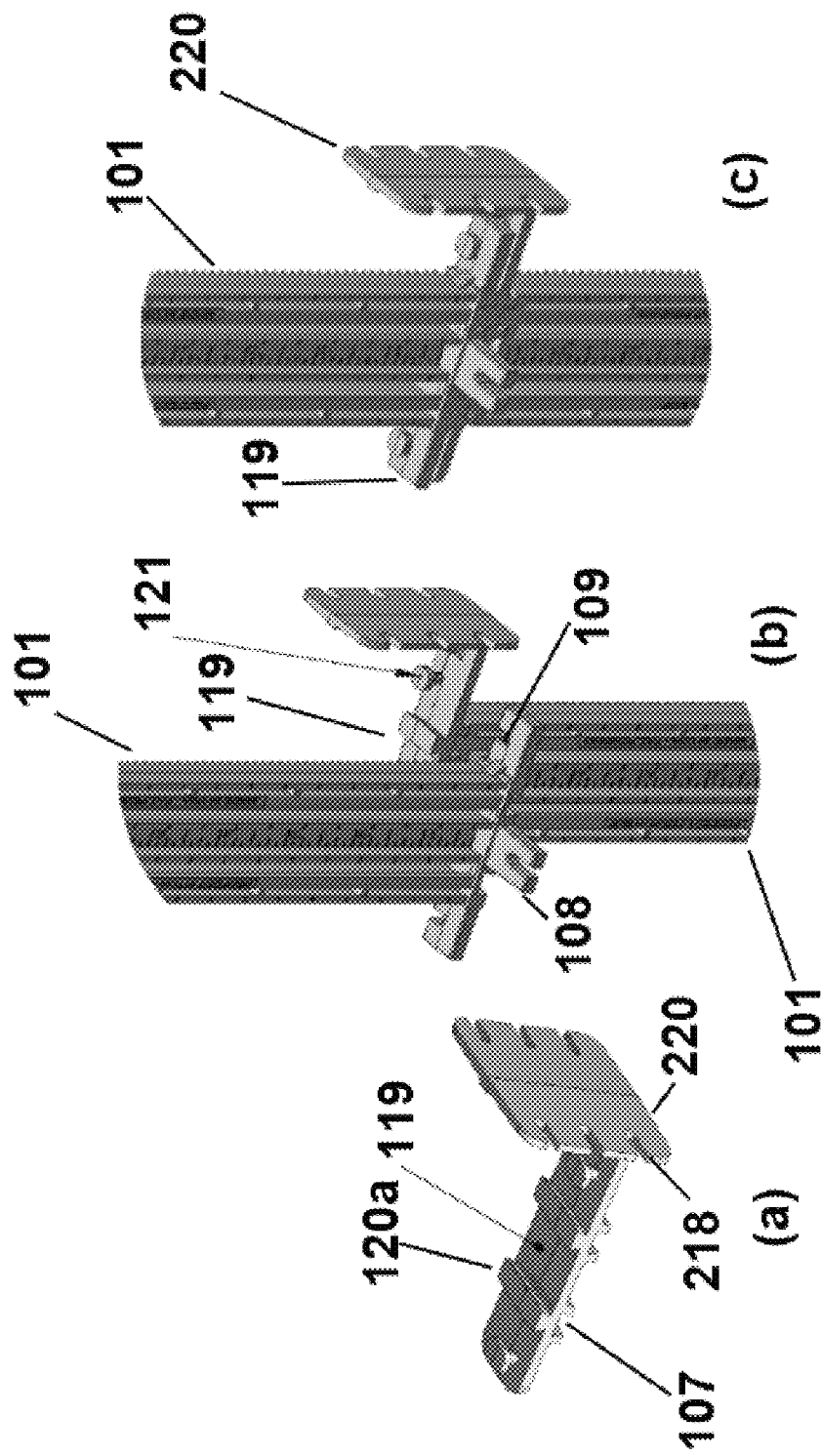
FIG. 3 illustrates a perspective view a 90 degree bracket assembly used for stacking multiple stanchions in accordance with one embodiment of the present invention.

With reference to FIG. 2 and FIG. 3, a second stanchion 101 can be ganged or extended by utilizing the dovetail 125 in combination with a first stanchion 101 having a dove tail receiving slot 120b or a 90 degree bracket 119 having a dove tail receiving slot 107 in accordance with one embodiment of the present invention. With further reference to FIG. 2 and FIG. 3, a stop 121 slips into stanchion 101 receiving slot 109, as dovetails 120a slip into receiving slots 120b (FIG. 2), such that the bracket assemble 119 and the stanchion cooperate in supporting the stanchion in three axial directions. For further support, the bracket 119 permits the stanchion 101 to be affixed to a vertical wall or stud surface via side member 220 and fastener slots 218 to a vertical support member, such as a wall stud or wall surface.

Figure 4:
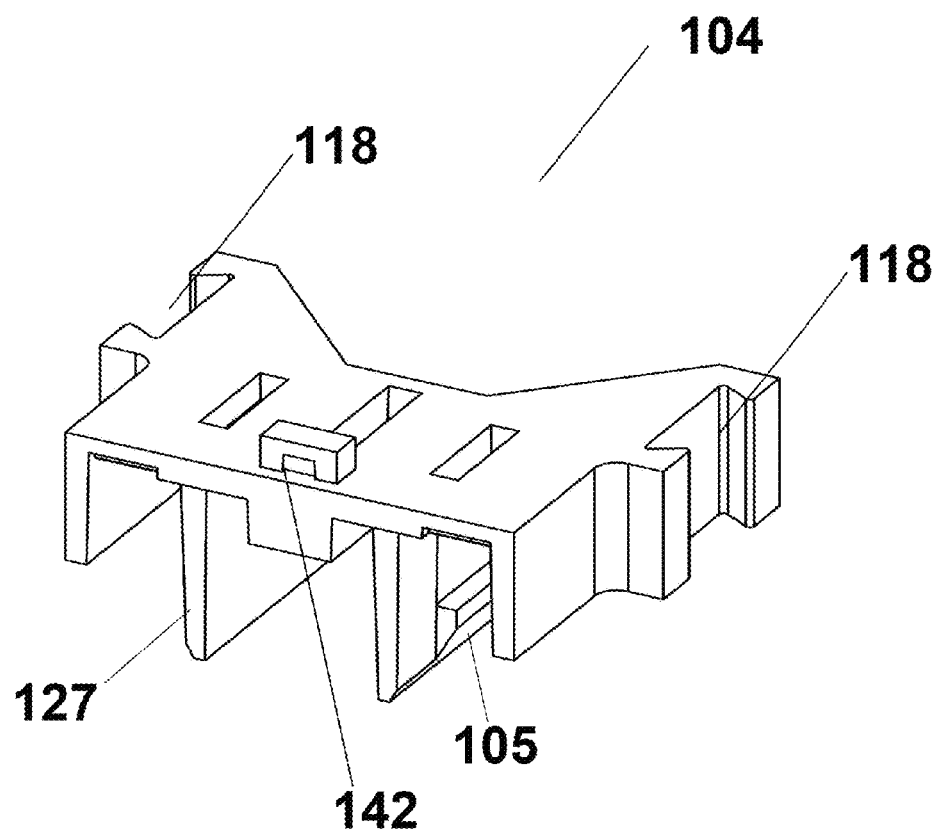
FIG. 4 illustrates a perspective view of a universal master adapter in accordance with one embodiment of the present invention.

FIG. 4 illustrates a master universal clamp 104 that employs dovetail guide-ways 118, one per side, to permit the mounting of any compatible holder, such as the pipe holder 114 described in FIG. 1, allowing the system 100 to be used modularly. Any accessory clamps whether for electrical wire, large or small diameter pipes etc., can quickly be interchanged/used with universal clamp 104.

Figure 5:
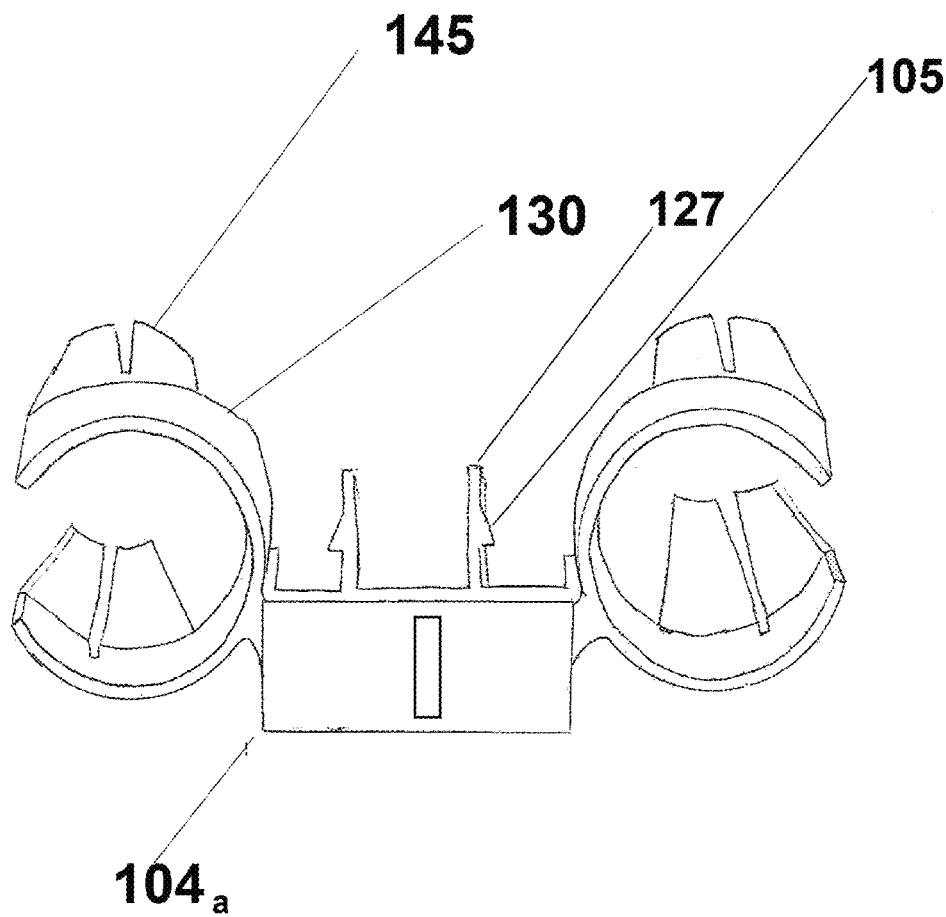
FIG. 5 illustrates a perspective view of a pipe holder for a gas fired furnace in accordance with one embodiment of the present invention.

FIG. 5 illustrates a perspective view of a gas furnace pipe holder 130 for pipe pitch applications in accordance with one embodiment of the present invention. The opening secures the pipe under the tension from fingers 145. The pipe holder 130 mounts onto the stanchion 101, through the incorporation of adapter 104a, shown in position for mounting in FIG. 2. A difference between adapter 104 as shown in FIG. 5 and adapter 104a in FIG. 4 is that the latter is a universal adapter that allows pipe holders and wire holders of varying types to mount on the stanchion 101 using a dovetail 117, whereas the former adapter 104a is integral to the pipe holder 130.

Figure 6:
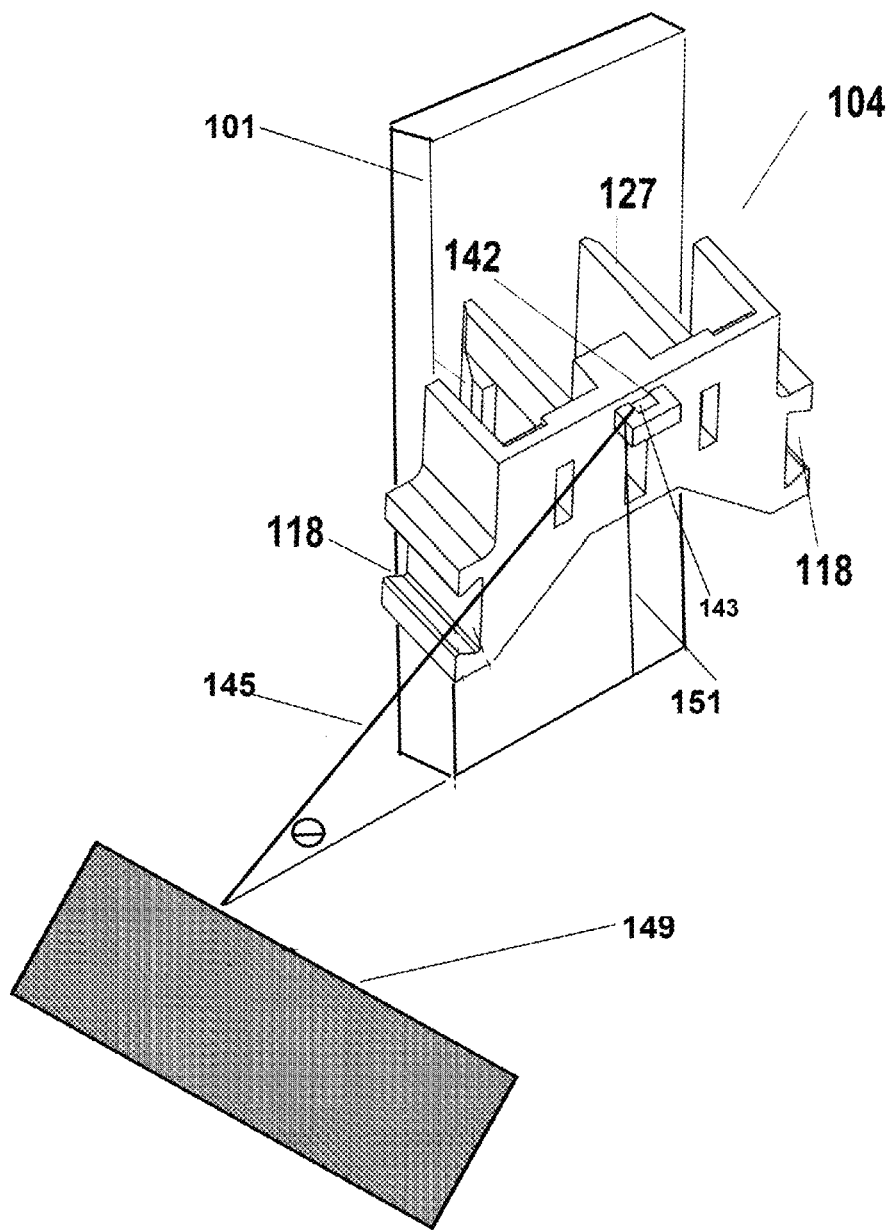
FIG. 6 illustrates a perspective view of a pitch setting apparatus in accordance with one embodiment of the present invention.

It is difficult and time consuming for roofer/applicators to obtain the proper pitch to drains on flat roof when using sprayed foam insulation. FIG. 6 illustrates a perspective view of a pipe pitch setting mechanism 142 in accordance with one embodiment of the present invention that is positioned on the backside and integral to the universal mount 104, and used for setting a proper pitch. The pitch is established by sliding the universal adapter 104a vertically on the stanchion 101 according to the position relative to a pitch line 149. The mount 104 has an eyelet comprised of boss 142 which contains a through-hole 143 to permit threading a string line 145. The mount is adjusted to a reference pitch elevation angle θ in establishing the pitch of where the universal mount stanchion 101 should be fixed in place, in reference to a roof pitch line 149. Once the applicator calculates the rise and run, he can set the toll at a proper height/elevation and easily follow the pitch of the string line to build up the roof pitch to ensure, by way of example and not limitation, that a proper drainage and pitch to roof top drains exists to prevent "ponding" and puddling on the roof.

Figure 7:
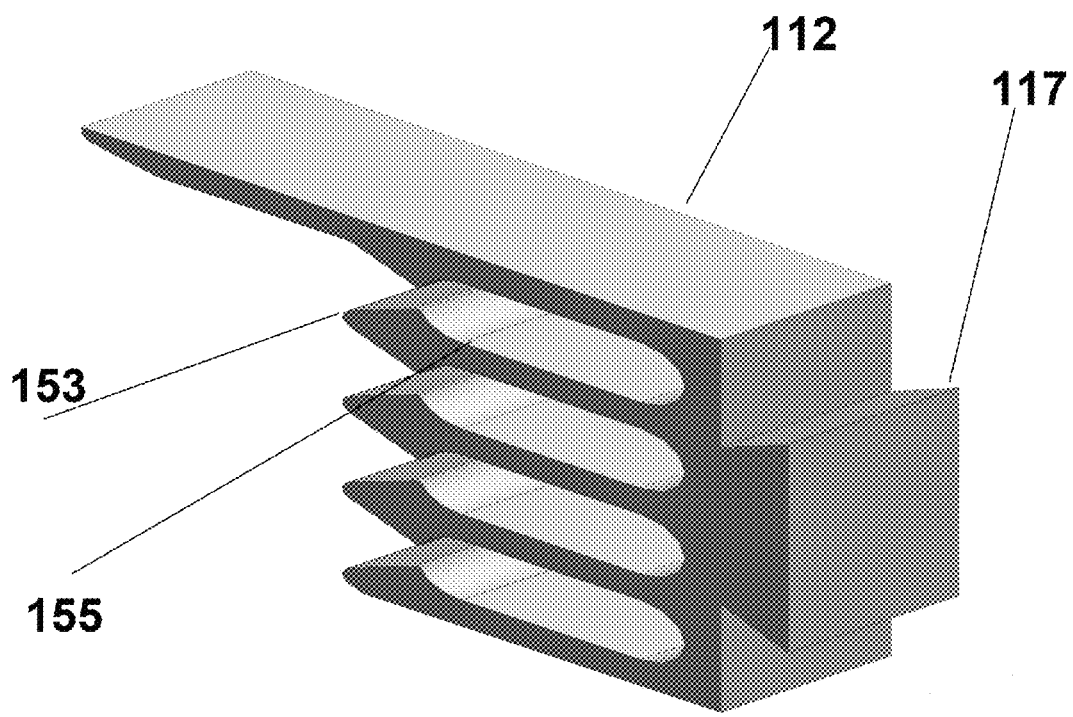
FIG. 7 illustrates a perspective view of a wire holder apparatus in accordance with one embodiment of the present invention.

FIG. 7 illustrates a perspective view of a wire holder 112 apparatus in accordance with one embodiment of the present invention. Wire holder 112 has a dove tail 117 that slips into a guide-way slot 118 on the universal adapter mount 104 that then affixes to the stanchion 101. The recess 155 which may be manufactured as multiple adapters allows wire and other types of utility devices to be held in place by preventing their slipping out of the recess by a protuberance 153, which may also be formed from any material resistance or tab-like gate (not shown).

With reference to FIG. 6, one embodiment of the invention herein also includes a method for pipe installation in a piping system including: mounting one or more pipes, each of said pipes in fixed association with mount 104, said mount vertically adjustably associated with the stanchion 101 for establishing a pitch between the pipe relative to the mounting surface, utilizing reference pitch elevation angle θ formed by the pitched reference 149 and string line 145 attached to the mount 104 to set a vertical distance 151 between the mount and the pitched reference 149.

The apparatus 100 of the invention including its component parts, such as the stanchion 101 and universal adapter 104, may be manufactured, by way of example and not limitation, from one of: any plastic, such as by way of example, Polyoxymethylene (Delrin, a registered trademark of E.I. du Pont de Nemours and Company) polyvinyl chloride PVC, chlorinated polyvinyl chloride CPVC, cast iron, or copper.

While the present invention has been described with reference to the illustrative embodiments, this description is not intended to be construed in a limiting sense. Various modifications of the illustrative embodiments, as well as other embodiments of the invention, will be apparent to those skilled in the art in reference to this description. It is expressly intended that all combinations of those elements that perform substantially the same function in substantially the same way to achieve the same results are within the scope of the invention. Substitutions of elements from one described embodiment to another are also fully intended and contemplated. It is therefore contemplated that the appended claims will cover any such modifications or embodiments as fall within the true scope of the invention.

We claim:

1. An apparatus for a piping system comprising: a first stanchion, having a dovetail at a head, and a second stanchion having an associated dovetail receiving slot at a foot, said dovetail and receiving slot cooperating for mating said first and second stanchions, each stanchion includes three parallel vertical beams, a center beam for guiding a pipe holder mount, and two outer beams, one on each side of the center beam, and whereby at least one stanchion is fixed to a mounting surface and is fixed to a pipe mount for establishing a distance from a pipe holder to the mounting surface creating a pitch of a pipeline in the direction of a sink and away from a source of a liquid to insure the proper rate of gravitational flow.

2. The apparatus of claim 1, wherein the second stanchion is mated to the first stanchion utilizing a bracket having a receiving slot to accept the first stanchion dovetail and having a dovetail to accept a receiving slot of the second stanchion.

3. The apparatus of claim 1, wherein the material of manufacture of the stanchion is one of: Polyoxymethylene, polyvinyl chloride PVC, chlorinated polyvinyl chloride CPVC, cast iron, or copper.

4. The apparatus of claim 1, wherein a pipe holder is secured to the one or more stanchions using an adapter secured by the stanchion, said adapter having a dovetail slot to accept a pipe holder having a dovetail slot.

5. The apparatus of claim 4, wherein the pipe holder having a dovetail slot is shaped as a U-channel.

6. The apparatus of claim 4, wherein the pipe holder having a dovetail slot is configured to retain wire cable.

7. The apparatus of claim 1, wherein a mounting foot secures one of the stanchions to a surface.

8. The apparatus of claim 1, further including, a universal fixture, secured to at least one of the first or second stanchion two outer beams, the fixture employing a dovetail receiving slot on each side, to permit mounting at least one pipe holder having a dovetail.

9. The apparatus of claim 1, further including an eyelet comprised of a boss which contains a through hole to permit threading a string line.

10. The apparatus of claim 8 is further adjustable to a reference pitch elevation angle θ in establishing the pitch in reference to a pitch line.

\* \* \* \* \*